United States Patent
Mansouri et al.

(10) Patent No.: US 11,256,224 B2
(45) Date of Patent: Feb. 22, 2022

(54) VIRTUAL DESIGN ENGINEERING

(71) Applicant: ROCKWELL AUTOMATION TECHNOLOGIES, INC., Mayfield Heights, OH (US)

(72) Inventors: Haithem Mansouri, Beachwood, OH (US); Francisco Maturana, Lyndhurst, OH (US); Leopoldo Paredes, Weston, FL (US)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 503 days.

(21) Appl. No.: 14/504,384

(22) Filed: Oct. 1, 2014

(65) Prior Publication Data

US 2016/0098025 A1 Apr. 7, 2016

(51) Int. Cl.
*G05B 13/02* (2006.01)
*G05B 17/02* (2006.01)

(52) U.S. Cl.
CPC .................... *G05B 17/02* (2013.01)

(58) Field of Classification Search
CPC ..................................................... G05B 17/02
USPC ........................................................... 700/29
See application file for complete search history.

(56) References Cited

U.S. PATENT DOCUMENTS

| | | | | |
|---|---|---|---|---|
| 5,446,652 A * | 8/1995 | Peterson | ................. | G06F 30/20 703/6 |
| 6,256,364 B1 * | 7/2001 | Toth | ........................ | A61B 6/06 378/19 |
| 6,944,584 B1 * | 9/2005 | Tenney | ................... | B25J 9/1671 700/17 |
| 7,991,602 B2 * | 8/2011 | Maturana | ............... | G05B 17/02 700/275 |
| 8,543,367 B1 * | 9/2013 | Van Rompaey | ...... | G06F 11/261 703/14 |
| 2004/0030418 A1 * | 2/2004 | Hamm | ................... | G05B 17/02 700/30 |
| 2005/0234565 A1 * | 10/2005 | Marks | .................. | G05B 19/409 700/61 |
| 2008/0131290 A1 * | 6/2008 | Magoon | .................. | F04B 13/00 417/38 |

(Continued)

OTHER PUBLICATIONS

Henrik Olsson, "Mach3 Tutorial—Setting up a Basic Three Axis Milling Machine. Based on Mach3 2.5," retrieved from Internet: URL:https://web.archive.org/web/20120328145734/http://www.micro-machine-shop.com/Mach3Mill_Setup.pdf, retrieved on Jun. 7, 2016, p. 6, para. 2.

*Primary Examiner* — Evral E Bodden

(57) ABSTRACT

Systems, methods, and software to facilitate simulating machines used in industrial automation are disclosed herein. In at least one implementation, motion of a solid model of a machine is analyzed to generate a motion profile of the solid model. An industrial controller system is then configured based on the motion profile of the solid model. A simulation of the machine controlled by the industrial controller system is executed, and motion of the simulation of the machine as controlled by the industrial controller system is analyzed. The motion of the simulation of the machine is then compared to the motion profile of the solid model to determine how closely the motion of the simulation of the machine as controlled by the industrial controller system matches the motion profile of the solid model.

18 Claims, 7 Drawing Sheets

(56) References Cited

U.S. PATENT DOCUMENTS

| | | | |
|---|---|---|---|
| 2010/0180263 A1* | 7/2010 | Lee | G06F 11/3636 |
| | | | 717/135 |
| 2011/0295391 A1 | 12/2011 | Schneider et al. | |
| 2012/0101679 A1* | 4/2012 | Anderson | B25J 9/1671 |
| | | | 701/23 |
| 2014/0180644 A1* | 6/2014 | Maturana | G05B 17/02 |
| | | | 703/1 |
| 2014/0214382 A1* | 7/2014 | Haas | G06F 30/20 |
| | | | 703/6 |
| 2015/0066167 A1* | 3/2015 | Schmidt | G05B 13/042 |
| | | | 700/86 |
| 2015/0199955 A1* | 7/2015 | Draganic | G10K 15/02 |
| | | | 381/86 |

* cited by examiner

VIRTUAL DESIGN ENGINEERING

TECHNICAL BACKGROUND

Simulation of industrial equipment can be essential in designing, prototyping, and demonstrating the different design options to engineers, customers, and other interested parties. Such simulations can be utilized to emulate virtualized operation of their corresponding physical devices over time, and may be further used in providing visual representations of the various simulated devices. In some examples, simulation and modeling applications may be used to define parameters for simulated mechanical components. These parameters ensure that the emulated equipment performs in the same manner during a simulation as can be expected for their real-world counterparts.

In addition to the physical industrial equipment that provides the mechanical functionality to perform various industrial operations, controller systems are also essential components of an industrial automation environment. Industrial controller systems are commonly hardware-based devices, such as a programmable logic controller (PLC), although controllers may also be emulated in software in some instances. Industrial controller systems are typically utilized to provide control instructions to physical machines to accomplish various tasks in an industrial plant, such as product manufacturing, materials handling, batch processing, supervisory control, and other industrial functions. As a result, by combining industrial machinery with the proper controller, an industrial system can be created that is capable of performing various operations.

OVERVIEW

Systems, methods, and software to facilitate simulating machines used in industrial automation are disclosed herein. In at least one implementation, motion of a solid model of a machine is analyzed to generate a motion profile of the solid model. An industrial controller system is the configured based on the motion profile of the solid model. A simulation of the machine controlled by the industrial controller system is executed, and motion of the simulation of the machine as controlled by the industrial controller system is analyzed. The motion of the simulation of the machine is then compared to the motion profile of the solid model to determine how closely the motion of the simulation of the machine as controlled by the industrial controller system matches the motion profile of the solid model.

This Overview is provided to introduce a selection of concepts in a simplified form that are further described below in the Technical Disclosure. It should be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by claims and their equivalents.

Industrial automation environments, such as automobile manufacturing factories, food processing plants, oil drilling operations, microprocessor fabrication facilities, and other types of industrial enterprises, typically employ several machines and other equipment to carry out their business operations. For example, an industrial automation enterprise could employ machines comprising sensors, drives, pumps, filters, drills, motors, robots, mills, printers, carousels, fabrication machinery, or any other industrial automation equipment. During the design, prototyping, and testing phases of product development, these machines and other devices used in industrial automation may be simulated using computing systems to provide virtual representations to engineers and customers of the end product. These simulations typically include physical attributes, parameters, and other aspects of the machine being simulated to ensure a proper emulation is furnished by the computing system. In some examples, a user may desire to have control over a simulated device to further illustrate the functionality and operation of the device as can be expected when physically implemented. As a result, the user may prefer to attach one or more real or emulated controllers to the simulated device to demonstrate and test the different controllable operations of the device.

Figure 1:
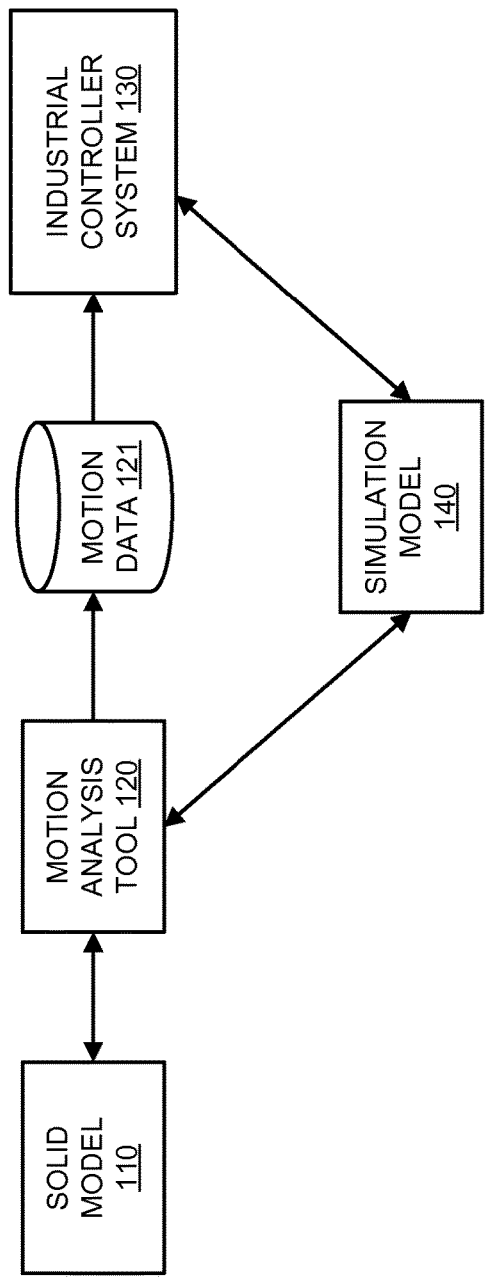
FIG. 1 is a block diagram that illustrates a computing system that may be used to facilitate simulating machines used in industrial automation.

FIG. 1 is a block diagram that illustrates computing system 100 that may be used to facilitate simulating machines used in industrial automation. In this implementation, computing system 100 includes a solid model 110, a motion analysis tool 120, motion data storage system 121, industrial controller system 130, and a simulation model 140. Computing system 100 is representative of any computing environment, which could include several different systems and devices located in geographically diverse areas and interconnected via communication networks in a distributed manner in some examples.

Advanced product development techniques are used in industrial manufacturing technology to reduce product design cycle time and sustain market competition. Complex product designs may be facilitated through the use of sophisticated computer-aided design (CAD) software tools. Typically, these CAD designs include high-level model information such as body mass, inertia, stiffness, and tension. These models may also contain information about the integrity between different parts, clearance, joint movement, and other parameters.

In FIG. 1, solid model 110 comprises a three-dimensional virtual model of a machine, such as a model that may be developed using a CAD tool, for example. Motion analysis tool 120 may be used to analyze the motion and operation of a machine, model, simulation, or some other representation in order to generate a motion profile. The motion analysis tool 120 may store the motion profile, parameters, and other data obtained from performing motion analysis in the motion data storage system 121, which could comprise a database, hard drive, memory device, or any other storage system—including combinations thereof. Industrial controller system 130 comprises, for example, an industrial controller, which could include automation controllers, programmable logic controllers (PLCs), or any other controllers used in automation control. Industrial controller system 130 could comprise one or more physical and/or emulated controllers implemented in software—including combinations thereof. Simulation model 140 comprises definitions for a virtual representation of at least a portion of a machine used in an industrial automation environment. Simulation model 130 is typically created, at least in part, using a simulation application. For example, the simulation application could comprise a third-party simulation framework tool, such as MATLAB® Simulink™, although the simulation application could comprise any other suitable simulation application or combination of applications in some implementations. An operation of computing system 100 will now be described with respect to FIG. 2.

Figure 2:
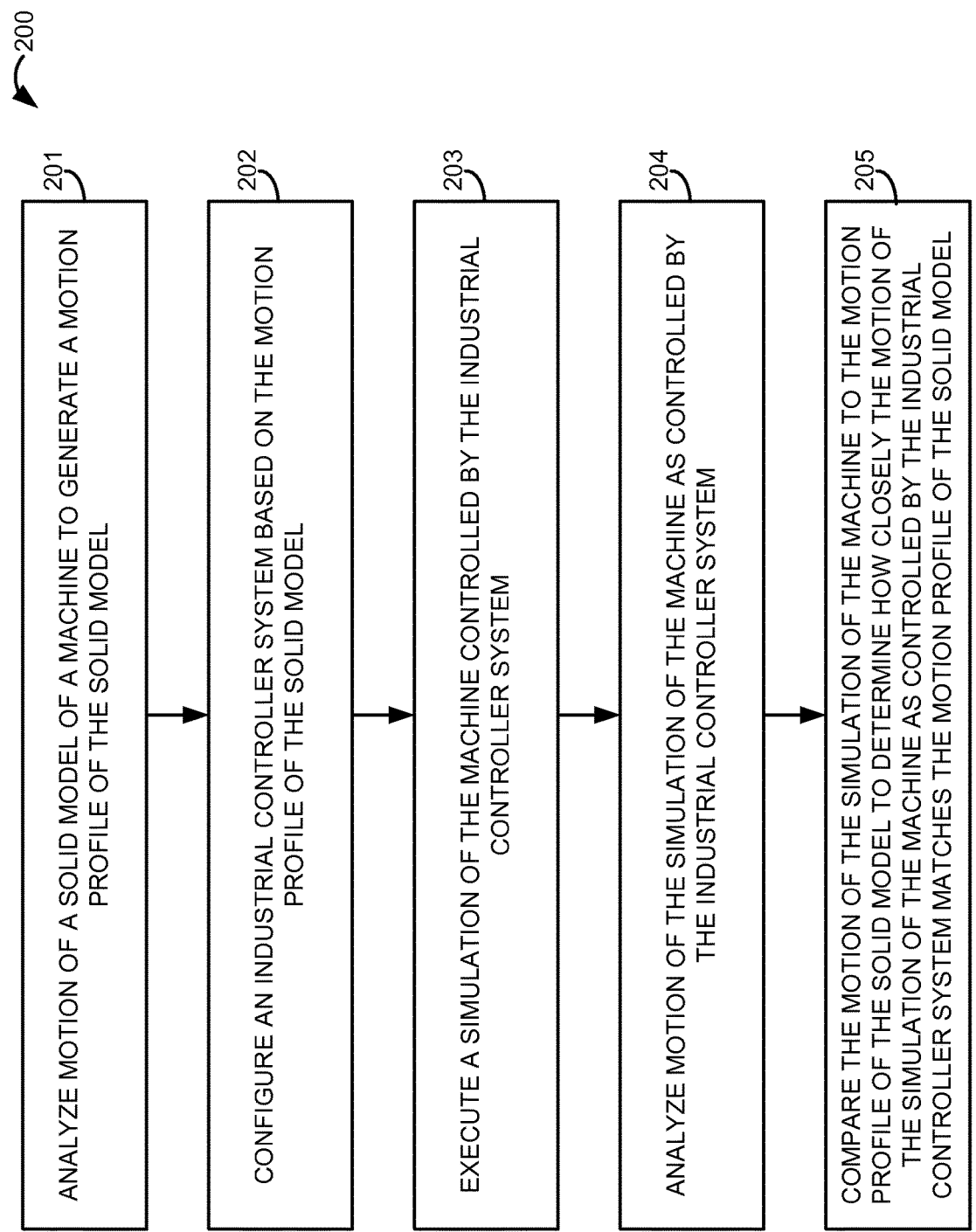
FIG. 2 is a flow diagram that illustrates an operation of a computing system in an exemplary implementation.

FIG. 2 is a flow diagram that illustrates an operation 200 of computing system 100 in an exemplary implementation. The operation 200 shown in FIG. 2 may also be referred to as simulation process 200 herein. The steps of operation 200 are indicated below parenthetically. The following discussion of simulation process 200 will proceed with reference to computing system 100 of FIG. 1 in order to illustrate its operations, but note that the details provided in FIG. 1 are merely exemplary and not intended to limit the scope of simulation process 200 to the specific implementation shown in FIG. 1.

Simulation process 200 may be employed to operate computing system 100 to facilitate simulating machines used in industrial automation. As shown in the operational flow of simulation process 200, computing system 100 analyzes motion of a solid model 110 of a machine to generate a motion profile of the solid model 110 (201). In some examples, analyzing the motion of the solid model 110 of the machine to generate the motion profile of the solid model 110 could comprise analyzing the motion of a three-dimensional virtual model of the machine implemented in software. Computing system 100 would typically utilize motion analysis tool 120 to analyze the motion of solid model 110, but other applications could be used in some examples. Typically, the solid model 110 of the machine is executed so that the motion of the solid model 110 can be analyzed in real time to generate the motion profile, which may include the velocity, acceleration, articulation, and other data that describes the motion of the solid model 110 while operating.

Computing system 100 configures industrial controller system 130 based on the motion profile of the solid model 110 (202). Industrial controller system 130 typically comprises an emulated industrial controller implemented in software, and once configured, may be used to provide movement instructions to a simulation model of a machine in order to control the operation and execution of the simulation. For example, computing system 100 may configure industrial controller system 130 with movement instructions to control a simulation of the machine according to the motion profile gleaned from analyzing the motion of the solid model 110 of the machine. In some examples, computing system 100 may configure industrial controller system 130 based on the motion profile of the solid model 110 by configuring industrial controller system 130 at least based on friction and inertia determined from the solid model 110. However, any other parameters could also be used to configure industrial controller system 130 and are within the scope of this disclosure.

Computing system 100 then execute a simulation of the machine controlled by industrial controller system 130 (203). The industrial controller system 130 provides control instructions to the simulation of the machine to direct its movement and operation, typically through the use of a specialized application programming interface (API). The simulation of the machine is typically generated by computing system 100, and may be based on the solid model 110 of the machine and/or its motion profile. In some examples, computing system 100 may convert the solid model 110 of the machine into the simulation of the machine. For example, computing system 100 may analyze the motion profile of the solid model 110 to generate the simulation of the machine in some examples. The simulation of the machine is then executed under the direction of industrial controller system 130 in order to simulate how the machine will operate when controlled in this manner.

Computing system 100 analyzes motion of the simulation of the machine as controlled by industrial controller system 130 (204). Computing system 100 would again typically utilize motion analysis tool 120 to analyze the motion of the simulation of the machine as controlled by industrial controller system 130, although other applications could be used in some examples. Typically, the simulation of the machine is executed under the control of industrial controller system 130 so that the motion of the simulation of the machine can be analyzed in real time, which may include the velocity, acceleration, articulation, and other parameters that describe the motion of the simulation of the machine while in operation as controlled by industrial controller system 130.

Computing system 100 compares the motion of the simulation of the machine to the motion profile of the solid model 110 to determine how closely the motion of the simulation of the machine as controlled by the industrial controller system 130 matches the motion profile of the solid model 110 (205). By comparing the motion of the simulation to the motion of the solid model 110, computing system 100 is able to determine how accurately industrial controller system 130 is controlling the simulation. In some examples, computing system 110 may utilize this comparison to fine-tune the configuration of industrial controller system 130. For example, computing system 100 may reconfigure industrial controller system 130 to control the simulation of the machine more closely to the motion profile of the solid model 110. In this manner, the control algorithms for industrial controller system 130 are improved, thereby enabling the simulation of the machine controlled by industrial controller system 130 to better emulate the action movement and operations of the machine being simulated.

Figure 3:
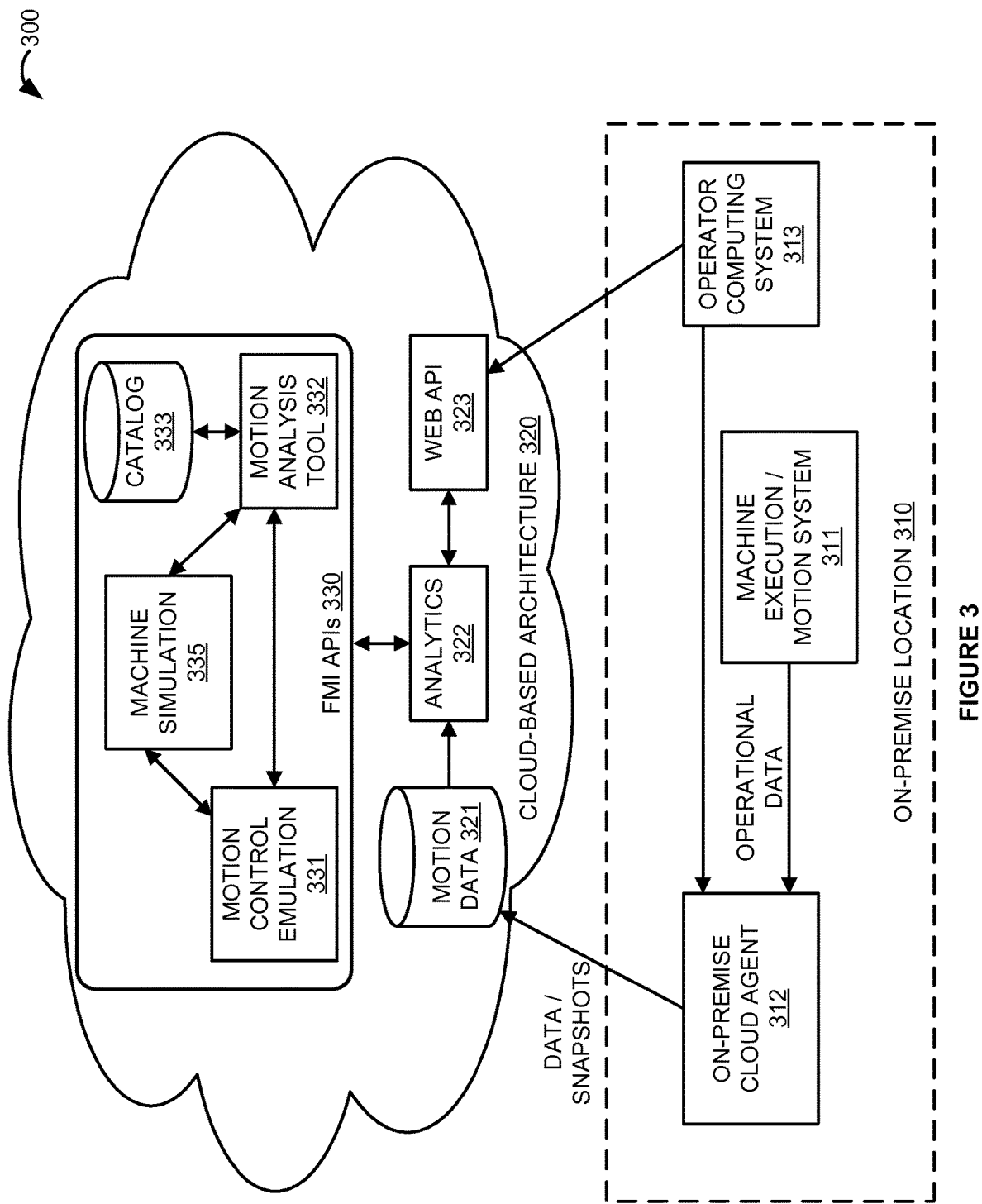
FIG. 3 is a block diagram that illustrates a computing system comprising a cloud-based architecture to support data exchange for simulating machines used in industrial automation in an exemplary implementation.

FIG. 3 is a block diagram that illustrates computing system 300 that may be used to facilitate simulating machines used in industrial automation. In this implementation, computing system 300 includes an on-premise location 310 and a cloud-based architecture 320. On-premise location 310 could comprise any location where computing systems and machinery may be executed, but would typically comprise a factory floor, manufacturing facility, laboratory, research and development center, or some other kind of workspace. On-premise location 310 includes machine execution/motion system 311, on-premise cloud agent 312, and operator computing system 313. Cloud-based architecture 320 includes motion data storage system 321, analytics engine 322, web application programming interface (API) 323, and functional mock-up interface (FMI) APIs 330. The FMI APIs 330 include motion control emulation 331, motion analysis tool 332, mechanical components catalog database 333, and machine simulation 335.

Generally, computing system 300 provides for motion analysis based on high performance computing that utilizes emulation of the control program, simulation of the machine, and a set of interfaces to connect the application. The system supports advanced motion control capabilities as a service, including controller emulation, machine simulation, and motion analysis. A web portal provides for remote motion analysis configuration and management.

Data connectivity is achieved though FMI, which defines a standardized interface to be used in computer simulations to develop complex cyberphysical systems. These cyberphysical systems are represented in functional mock-up units (FMUs) that provide the functions necessary to generate the simulation. The functional mock-up units typically include an extensible markup language (XML) file comprising definitions of the variables used by the FMUs, equations used by the model, which may be defined as a set of functions, and other optional data, such as parameter tables, a user interface, and documentation which may be needed by the model, among other things.

In some examples, machine execution/motion system 311 could comprise a physical machine and its associated control system, which could comprise an industrial controller, automation controller, programmable logic controller (PLC), or any other controller used in automation control. An operator utilizes operator computing system 313 to interact with the on-premise cloud agent 312 and to interact with elements in the cloud-based architecture 120 through the web API 323.

In operation, machine execution/motion system 311 is executed and provides operational data to the on-premise cloud agent 312. For example, machine execution/motion system 311 could comprise a real physical system having a machine executing in the on-premise location 310 that produces real-time processes, such as temperature, flow, vibration, and the like, along with control data, such as proportional integral derivative (PID) signals, on/off signals, loop control signals, and the like. This data is collected by the on-premise cloud agent 312 and fed into a big data repository in the cloud environment 320. A cloud-based big data repository is represented by the motion data storage system 321 in FIG. 3. In this manner, the on-premise cloud agent data collector 312 captures operational data from the machine execution/motion system 311 and provides this data in the form of snapshots to the motion data storage system 321 in the cloud-based architecture 320.

The data correlation analytics engine 322 creates a model of the on-premise process which over time achieves greater and greater accuracy as more operational data is collected and analyzed. The model of the on-premise process may then be utilized to correlate the set point (i.e., motion profile), process variables (such as the actual speed and position of the machine), and control variables (i.e., control signals) into a virtual model that represents the actual system. Data that is collected from the on-premise location 310 may also be segregated by on-premise cloud agent 312 such that different portions of the machine and process can be understood and modeled individually. The behavior of the machine can then be learned to create a model of the machine, or a library of models. This model is the result of the motion data 321 and analytics 322 combined to create the machine simulation 335. In some implementations, the machine simulation 335 could also be provided from pre-built models or from third-party simulation library vendors. The control program from the on-premise location 310 is then virtualized and executed as motion control emulation 331 in the cloud-based architecture 320.

A designer of a new machine, or an improvement to an existing machine, can then select appropriate mechanical components, such as a drive and motor, from the catalog database 333 by using the motion analysis tool 332, typically via a web interface. Then, the motor and the drive are rendered as simulation models that can be connected to the machine simulation 335 and the emulation motion control program 331 in the cloud 320. The machine simulation 335 can then be executed in the cloud 320 with the selected motor and drive to observe and predict the operational behavior and performance response. In some implementations, this machine simulation with the selected motor and drive models may be executed in the cloud 320 under a simulated load in order to determine if the selected motor and drive are suitable to handle the load.

In some implementations, machine simulation 335 may be generated from a pre-built machine simulation library provided by original equipment manufacturer (OEM) vendors or other sources. However, the mechanical components catalog 333 may still be used with a machine simulation 335 generated from the pre-built simulation library. A library of machine simulations can then be built by combining the motion data 321 and analytics 322 as described in the above techniques. Advantageously, the cloud environment 320 and the FMI APIs 330 provide the versatility to combine models from different sources. In cases where there is not a physical machine to generate motion data, the designer can leverage third party models into the sizing environment to facilitate selection of a drive and motor from the mechanical components catalog 333. A virtualized control program capable of controlling the machine simulation 335 with the selected drive and motor can then be selected from a library.

In some examples, the designer can perform the above operations by utilizing the operator computing system 313 in the on-premise location 310 through a sizing and selection dashboard, which provides a user interface into the cloud environment 320 via the web API 323. In addition, the designer can make modifications to the machine simulation 335 and the virtualized control program (i.e., motion control emulation 331) to increment the libraries. Further, the designer can completely design the control logic system or the machine using the sizing and selection methodology.

Advantageously, the cloud-based architecture 320 is utilized as the main container for the above-described techniques and functionality because the high performance computing provided by the cloud 320 may be leveraged, thereby avoiding whatever limitations may be introduced by the server hardware at the on-premise location 310. In addition, the deployment of big data repositories in the cloud 320 as the main collector of motion data, as represented by motion data storage system 321 in FIG. 3, provides for a massive, robust, remote storage solution. Finally, by correlating the motion profile, process variables, and control variables, a virtual model of the system may be created that may be used to represent the actual system.

Figure 4:
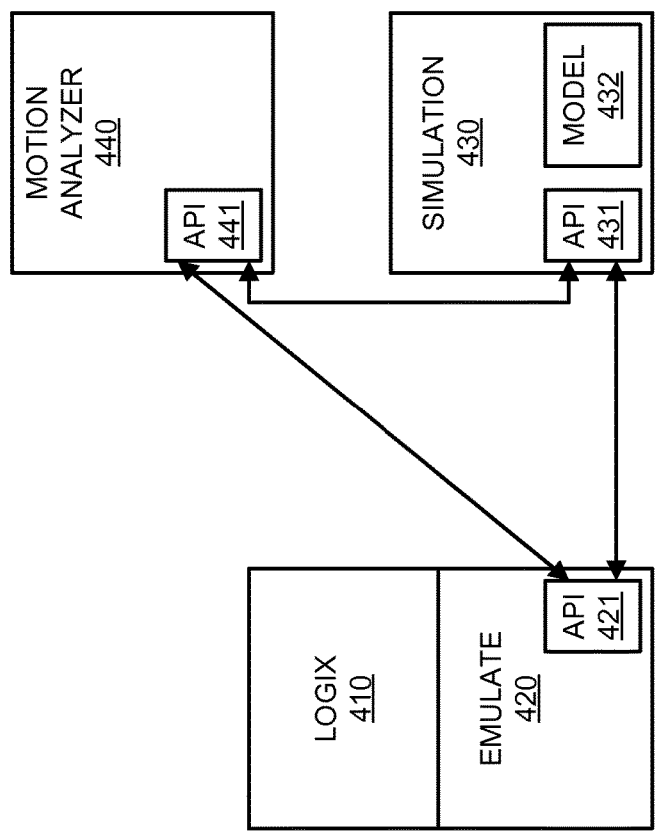
FIG. 4 is a block diagram that illustrates an operational scenario involving a computing system in an exemplary implementation.

Referring now to FIG. 4, FIG. 4 is a block diagram that illustrates an operational scenario involving computing system 400 in an exemplary implementation. Computing system 400 includes logix 410, emulate 420, simulation 430, and motion analyzer 440. Emulate 420 includes API 421. Simulation 430 includes API 431 and simulation model 432. Motion analyzer 440 includes API 441. API 421 and API 431 are linked in bi-directional communication, as are API 421 and API 441. Likewise, API 431 and API 441 are also linked in bi-directional communication. In this implementation, API 421 of emulate 420 provides a public interface API. In accordance with the architecture shown in FIG. 4, an integration is established between motion analyzer 440 to simulation 430, emulate 420 to simulation 430, and emulate 420 to motion analyzer 440.

Motion analyzer 440 comprises profiles of motors and drives that are available for selection when designing a machine, such as a robot that may be used in a manufacturing process. However, because the profiles of motors and drives are ideal, they are missing most of the configurations of the gains, and several other aspects of these mechanical components may be off when performing the selection. To address this concern, the power of the motion analyzer tool 440 may be augmented to become a more comprehensive virtual design engineering tool that will play in motion and may be used to help validate the control algorithm. In addition, all of the gain elements and configurations will be made available, which provides for the rest of the I/O branch.

In one exemplary implementation, a test simulation can be run with up to six axes of motion, and these axes may be combined into one singular model and their movement and operation synchronized without using the motion analyzer tool 440. After the axes are combined and synchronized, a instruction for the motion analyzer 440 may be executed and by analyzing the motion of the drive and motor the motion analyzer 440 will output the command position, command velocity, and command acceleration, which may be fed back into the model to produce the response profile of the machine in motion. This configuration data is then transferred to the emulate tool 420 through the API 421.

The configuration data received by the emulate tool 420 includes the drive and motor configurations and motion profiles, along with models for simulating a load on the drive and motor, such as models of inertia, friction, thermal output, vibrational energy, power consumption, and any other real-world physical constraints that the designer may want to simulate. Through the API 441 in the motion analyzer 440, the motion analyzer 440 becomes an engine during execution of the simulation under the load. In this manner, the motion analyzer 440 may be used to facilitate selecting the appropriately sized drive and motor for the machine based on evaluating how the selected motor and drive performs under the simulated load and enables the designer to fine-tune the configuration of the drive and motor.

The emulate tool 421 serves to emulate an industrial controller that provides control instructions to drive the motion of the machine by controlling the drive, motor, and other mechanical components. For example, the emulated controller 420 includes motion instructions needed to control the machine simulation 430. The controller emulator 420 executes various command instructions and connects multiple axes of motion of the machine simulation 430 to the simulation session through the API 421. This emulated controller 421 may be specially configured by the machine designer to work in harmony with the machine being designed. Ultimately, the configuration of the emulated controller 421 may be used to create a physical controller device that will perform the operation of the real, physical machine.

In one exemplary workflow, a controller emulation 420 may be executed to control the machine simulation 430. In this scenario, the controller emulation API 421 may be utilized to direct control data through to the machine simulation 430, and may also utilize the motion analyzer API 441 to analyze the motion of the simulated machine as operated under the control of the emulated controller 420. The emulator API 421 may be leveraged to connect the axes of the various machine components to the simulation 430.

In some implementations, the configuration of the emulated controller 420 may be imported and/or exported by the emulate API 421 through the motion analyzer API 441. The motion analyzer 440 is capable of handling multi-axis analysis and can generate and output configuration data for the control program to be used by the emulated controller 420 for driving the various axis of motion of the machine. The motion analyzer 440 is also programmed with the capability of utilizing and interacting with the emulator 420 API 421 and the simulation 430 API 431.

In some circumstances, a machine designer may want to simulate the operation of a machine with a motor, but has not yet selected a particular motor for the job. In this case, an implementation of a set of libraries that can be used to simulate the operation of various available motors and drives may be provided to the designer, along with an engine to configure the parameters from these libraries. The controller emulator 420 is then provided with the motion profile, the axes for the machine, and the motors. The axis configuration needs to be configured with the ratio inertia, the gains, and other parameters that come from motion analyzer 440.

The instructions for the emulated controller 420 that will control and execute the machine simulation 430 need to be coordinated and translated through the emulator API 421 to output the command position, command velocity, and command acceleration. These commands may then be fed back into the model 432 to output the response profile. The instructions will take the actual position of the machine components to produce angular position, and the angular position may be processed to produce the necessary torque that the selected motor should be capable of providing. The torque can then be provided as an input to the drive, which is a function of the emulator program 420. This configuration is then transferred to the emulator 420, and the motion analyzer 440 and the emulator 420 connect the axes of the machine to the simulation 430 through the API 431. In the configuration phase, the motion analyzer 440 passes catalog information about the drive and motor to the model 432. In addition the catalog information provided to the model 432 by the motion analyzer tool 440 could include information about a transmission, differential, gear ratios, and other mechanical components that may be used in a motorized driveline. The control program is then executed by the controller emulator 420 to control the motion and operation of the machine simulation 430, which provides a means to validate the selection of the motor and drive to ensure the optimum mechanical components are selected having suitable characteristics to handle the load.

In the configuration phase, the designer operates the system to pass instructions between the emulated controller 420 and the machine simulation 430, and all the parameters pertaining to feedback and drive status are implicitly a part of the control program executed by the emulator 420. In addition, the designer can edit the motion profiles using an editor provided by the motion analyzer tool 440, and this edited motion profile may then be propagated from the motion analyzer 440 to the controller emulator 420.

During the runtime phase, where the machine simulation 430 is actually executed under the control of the controller emulator 420, the command position, velocity, and acceleration are provided by the emulator 420 to drive the motion of the machine, and actual values may be provided in feedback, such as load speed and the like. The runtime environment outputs the motion profile of the executed simulation 430 under a load, and this motion profile can be used along with the core algorithms from the motion analyzer 440. During runtime, the simulation 430 takes a complete motion profile and sends an encapsulated response to the motion analyzer 440 in the form of angular velocities of the motion of the simulated machine. Through the API 441 in the motion analyzer 440, the motion analyzer 440 plays the role of an engine in runtime loop mode, which performs an evaluation and cycles back to fine-tune the configuration of the selected drive and motor, effectively acting as a sizing and selection tool. Tags are also identified during simulation 430 runtime execution, where tags in the motion analyzer 440 have corresponding tags in the control program of the controller emulator 420 and vice versa.

When running the simulation 430, data related to the operation and performance of the motor, drive, and other mechanical components of the machine is collected and passed back to the motion analyzer 440, which provides the user with a better idea of how these components are operating and whether they are suitable for the application. The drive and motor configuration can be derived from motion profiles and defined through a logix design tool 410. To simulate the load, models that define inertia, friction, thermal output, power consumption, and other parameters may be obtained from a library. In some examples, machine designers may have their own library of models that define various load parameters, and the APIs 421, 431, and 441 can be utilized to command the system to perform an operation. The model 432 of the machine being simulated should typically comply with these APIs 421, 431, and 441, regardless of what programming language is used to design the model 432. Data is moved from the model 432 into the motion analysis system 440 through the API 441, which can be published in some examples. Third party simulation software can also be used with the system to generate the machine model 432 and to run the simulation 430, and can work in conjunction with logix 410 and motion analyzer 440. Finally, an emulation session 420 that provides emulated controller instructions to drive the motion of the simulation 430 may utilize the API 421 to transfer control data from the controller emulator 420 to the simulation 430 via the simulation API 431, and may also receive data from the motion analyzer 440 API 441. In this manner, a machine designer can determine and select the appropriate size motor and drive that are capable of moving the machine under a simulated load, thereby providing a more accurate representation of how a physical prototype of the machine will operate in the real world.

Figure 5:
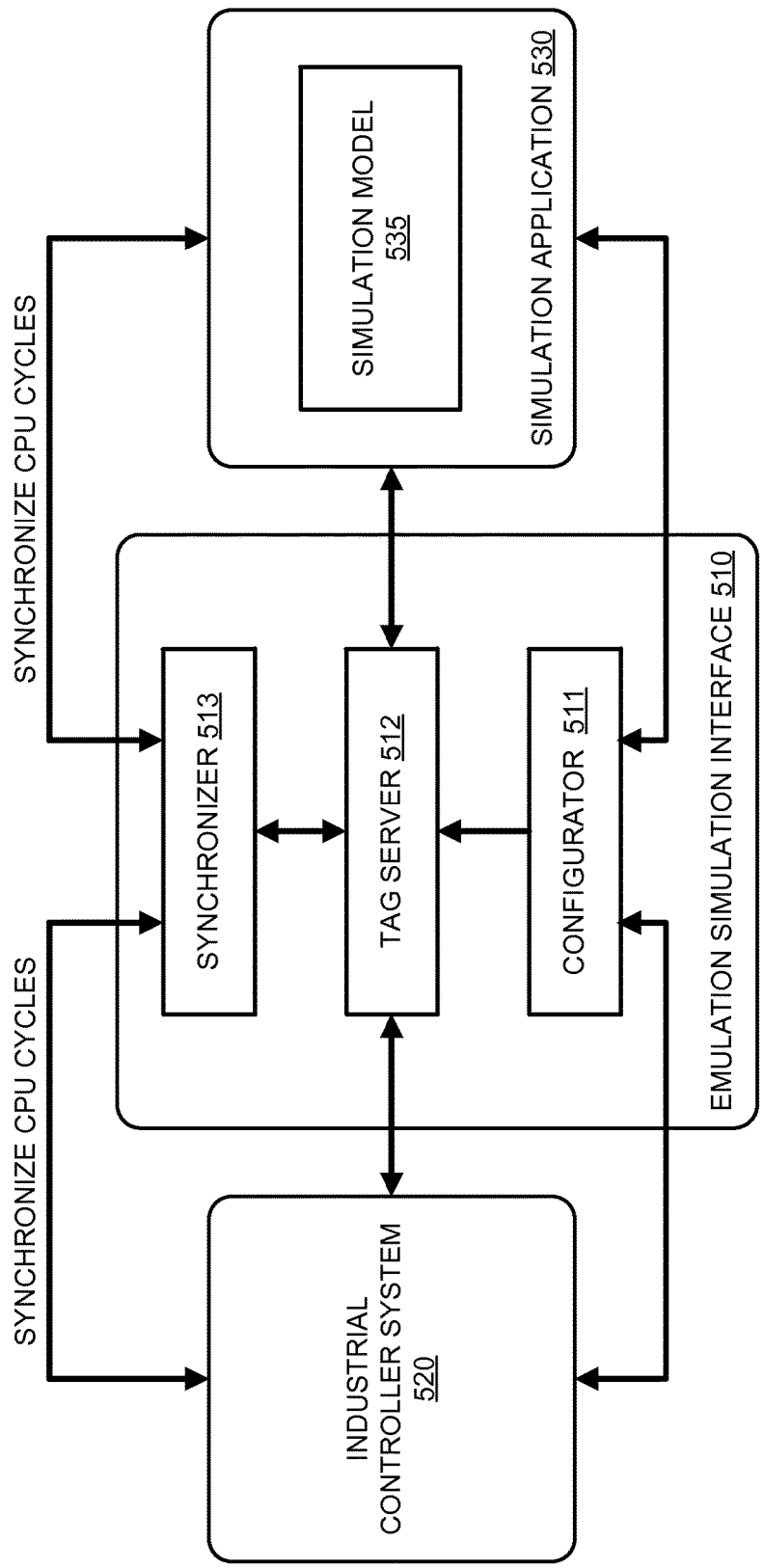
FIG. 5 is a block diagram that illustrates an operational scenario involving a computing system in an exemplary implementation.

Referring now to FIG. 5, FIG. 5 is a block diagram that illustrates an operational scenario 500 involving a computing system in an exemplary implementation. The computing system executes an emulation simulation interface (ESI) 510 and may execute some or all of the operations of industrial controller system 520 and simulation application 530. In some examples, the computing system could be a single device or could be distributed across many different systems and devices separated over diverse geographic areas.

As shown in FIG. 5, the ESI 510 includes a configurator module 511, a tag server 512, and a synchronizer 513. In this example, the industrial controller system 520 comprises a virtual controller emulator, such as RSLogix™ Emulate 5000 provided by Rockwell Automation, Inc. The simulation application 530 could comprise any third-party simulation framework tool that complies with the FMI standard, but the MATLAB® Simulink™ tool is used in this example. Thus, the simulation model 535 could comprise an .mdl file created in MATLAB® using library blocks for different systems.

The ESI 510 is used to connect controller tags to the simulation model 535 using FMI, which is achieved though MATLAB® in this example. To connect the virtual controller output signals to the simulation model 535, it is necessary to establish an interface between the simulation model 535 and the industrial controller system 520. To this end, the ESI 510 will set up an interface between input/output (I/O) signals of the controller 520 with the simulation model 535. The interface established by the ESI 510 enables connectivity and data exchange in a bidirectional manner between the simulation model 535 and the controller 520. In this example, the ESI 510 uses a virtual controller emulator such as RSLogix™ Emulate 5000 to encapsulate the control programs. The controller emulator mimics the operation of a ControlLogix™ programmable logic controller (PLC) but in software only. The virtual controller 520 transfers data to the simulation using output tags and receives data from the simulation using input tags.

The configurator component 511 hosts the application-level information for connecting the virtual controller 520 with the simulation model 535. Tag server 512 coordinates the input and output tags for data exchange. In some implementations, tag server 512 provides distributed communication connectivity services for connecting the communicating parts in the controller side of the spectrum. The co-simulation master from FMI coordinates communication between the FMUs. Underneath the tag server service, the controllers and their respective communications are coordinated with simulations, which can become a very complex network of communicating units.

The synchronizer 513 coordinates the clock progression between the controller 520 and the simulation model 535 to keep them synchronized. The clock synchronization is typically carried out in two phases. First, the co-simulation master coordinates global time among FMUs. Second, the tag server service 512 coordinates control level FMU time among the controllers. In situations where there is more than one control level FMU, time synchronization among them may be handled by the co-simulation master. An example of how the ESI 510 may be utilized to provide an interface between an emulated controller and a simulation model will now be discussed with respect to FIG. 6.

Figure 6:
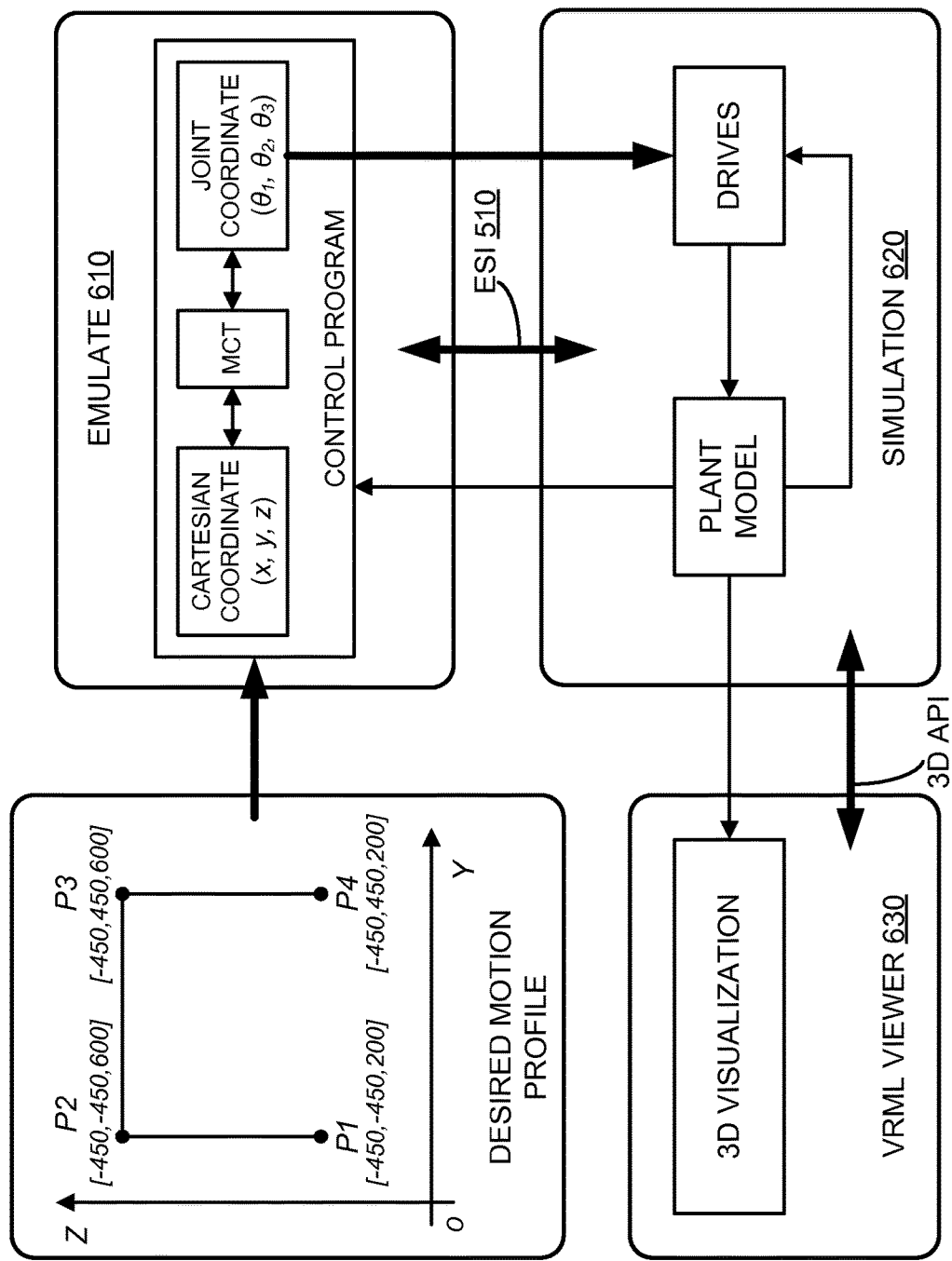
FIG. 6 is a block diagram that illustrates an operational scenario involving a computing system in an exemplary implementation.

FIG. 6 is a block diagram that illustrates an operational scenario 600 involving a computing system in an exemplary implementation. The implementation of FIG. 6 shows an example of utilizing emulation simulation interface (ESI) 510 of FIG. 5 to interface between a virtual controller emulator 610 and a simulation model 620. The emulated virtual controller 610 is configured with a control program according to a desired motion profile of a machine or one of its sub-components. In this example, the ESI 510 uses a virtual controller emulator 610 such as RSLogix™ Emulate 5000 to encapsulate the control programs. The controller emulator 610 mimics the operation of a ControlLogix™ programmable logic controller (PLC) but in software only. The virtual controller 610 transfers data to the simulation 620 using output tags and receives data from the simulation using input tags via the ESI 510.

To develop a control program, a machine designer provides a CAD model of the machine that includes schematics and an origin coordinate system where a pick and place motion trajectory should be originated. Using this information directly from the CAD model, four coordinate points P1, P2, P3, and P4 are defined in space for a pick and place application, as shown in the desired motion profile on FIG. 6.

Two PLC motion group instructions may be used to carry out the motion control: motion coordinate transform (MCT) and motion coordinate linear move (MCLM). The MCT instruction is used to link two coordinate systems together, as can be seen in the control program of the emulated controller 610. The MCT transform is used to move a non-Cartesian machine to Cartesian positions. The MCLM instruction is used to start a single or multi-dimensional linear coordinated move for the specified axis within a Cartesian coordinate system. The motion control algorithm is then defined with gain tuning capable of executing the target trajectory. Utilizing both the MCT and MCLM transforms allows for converting the Cartesian coordinates for each target point in the trajectory into driving torque for the joint actuators/motors in the machine.

The transform information flow that results in the desired motion trajectory is shown in the control program of the emulated controller 610. The MCLM instruction generates three axis motion profiles. In the MCLM equation, the absolute or incremental move speed, maximum acceleration and deceleration, and jerk for each axis can be specified. MCLM generates a set of three-dimensional Cartesian coordinate points from a starting point to an ending point based on a desired motion speed. These coordinate points are sent to MCT to produce a target angular position, as shown by the joint coordinate position in FIG. 6. This angular position is the input into the torque generator drives that work to make the motors rotate.

MCT generates command positions for each joint actuator using inverse kinematics calculations from Cartesian coordinates to joint axis coordinates, as shown in the control program of the emulated controller 610. The inverse kinematics calculations are based on the dimensions and geometry of the machine that were established in the CAD model and original design schematics. In this example, MCT produces command positions for three joints, corresponding to base, link 1, and link 2. Motor drives take these command position values and generate torque as an output for each joint axis movement. Current positions of the actuators are fed back to the drives for completing the closed loop control in between the drives and the motors. Advantageously, combining these different information sources helps facilitate the programming of the PLC for the operation of this machine.

The next step in the information flow is the integration of the motion control and system response visualization. The ESI 510 is utilized to generate associations between graphical components and motion coordinates. The intention in this step is to remove the graphical computation burden from the simulation so as to accelerate the simulation loop. In motion control applications, where response times are very stringent, separating the graphical computation from core calculations is desirable.

ESI 510 creates connection tags between the CAD assemblies and the motion control tags. Based on the component and tag connection information, the simulation model is extended with a set of connection ports representing the input side signals into the simulation and the output side signals from the simulation into the visualization tool via the three-dimensional (3D) API. Each component of the machine in the CAD assembly can be fully animated with motion tags that apply directly into the joint actuators. In this example, these motion tags may be connected to the base, link 1, and link 2 components in the assembly. This feature enables connecting any component of a machine with motion commands and provides the ability to test the operation of the component under the control of the motion commands in combination with realistic simulation and visualization as shown in FIG. 6.

In sum, the control program developed for the machine from the CAD model is downloaded into the emulated virtual controller 610. ESI 510 links the input and output tags of the emulated controller 610 and the simulation 620. ESI 510 then facilitates exchanging data between the control program and the simulation in real time. The machine simulation produces component rotation and translation data which may be transferred into the virtual reality modeling language (VRML) viewer 630 through the 3D API. Advantageously, the results of the motion control algorithm that was developed for controlling this machine may be checked by plotting the current position of the end effector in the simulation environment and comparing this position to the command position in the control program. In this manner, a developer can verify that a new control program for a machine controls the machine accurately and as intended by the machine's designer, before the machine or its PLC controller device are put into physical production.

Figure 7:
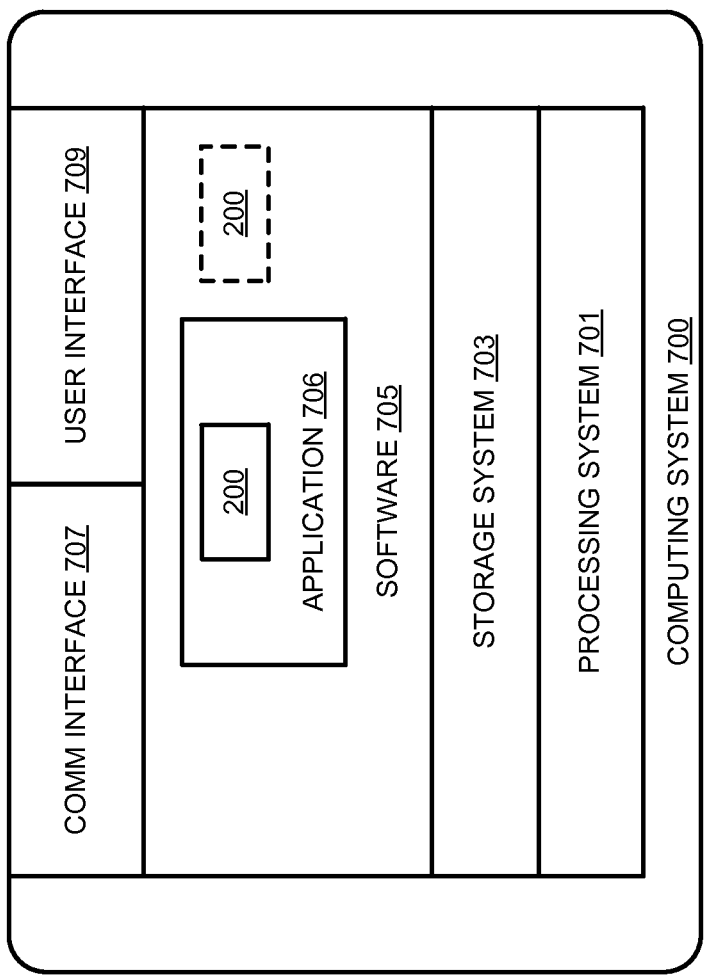
FIG. 7 is a block diagram that illustrates a computing system in an exemplary implementation.

FIG. 7 is a block diagram that illustrates computing system 700 in an exemplary implementation. Computing system 700 provides an example of computing system 100 or any system that may be used to facilitate simulating machines used in industrial automation, although other systems capable of performing the techniques disclosed herein could use alternative configurations. Computing system 700 is representative of a computing system that may be employed in any computing apparatus, system, or device, or collections thereof. For example, computing system 700 may be employed in server computers, cloud computing platforms, data centers, any physical or virtual computing machine, and any variation or combination thereof. In addition, computing system 700 may be employed in desktop computers, laptop computers, tablets, smartphones, or the like.

Computing system 700 includes processing system 701, storage system 703, software 705, communication interface 707, and user interface 709. Processing system 701 is operatively coupled with storage system 703, communication interface 707, and user interface 709. Processing system 701 loads and executes software 705 from storage system 703. Software 705 includes application 706 which itself includes simulation process 200. Simulation process 200 may optionally be implemented separately from application 706. When executed by computing system 700 in general, and processing system 701 in particular, software 705 directs computing system 700 to operate as described herein for simulation process 200 or variations thereof. Computing system 700 may optionally include additional devices, features, or functionality not discussed here for purposes of brevity.

Computing system 700 may be representative of any computing apparatus, system, or systems on which application 706 and simulation process 200 or variations thereof may be suitably implemented. Examples of computing system 700 include mobile computing devices, such as cell phones, tablet computers, laptop computers, notebook computers, and gaming devices, as well as any other type of mobile computing devices and any combination or variation thereof. Note that the features and functionality of computing system 700 may apply as well to desktop computers, server computers, and virtual machines, as well as any other type of computing system, variation, or combination thereof.

Referring still to FIG. 7, processing system 701 may comprise a microprocessor and other circuitry that retrieves and executes software 705 from storage system 703. Processing system 701 may be implemented within a single processing device but may also be distributed across multiple processing devices or sub-systems that cooperate in executing program instructions. Examples of processing system 701 include general purpose central processing units, application specific processors, and logic devices, as well as any other type of processing device, combinations, or variations thereof.

Storage system 703 may comprise any non-transitory computer-readable media or storage media readable by processing system 701 and capable of storing software 705, such as a disk drive, flash drive, data storage circuitry, or some other hardware memory apparatus. In some examples, a computer apparatus could comprise storage system 703 and operating software 705. Storage system 703 may include volatile and nonvolatile, removable and non-removable media implemented in any method or technology for storage of information, such as computer readable instructions, data structures, program modules, or other data. Storage system 703 may be implemented as a single storage device but may also be implemented across multiple storage devices or sub-systems co-located or distributed relative to each other—including devices in different geographic areas. Storage system 703 may also be embedded in various types of equipment. Storage system 703 may comprise additional elements, such as a controller, capable of communicating with processing system 701. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that may be accessed by an instruction execution system, as well as any combination or variation thereof, or any other type of storage media. In no case is the storage media a propagated signal.

In operation, processing system 701 loads and executes portions of software 705, such as simulation process 200, in order to operate as described herein. In particular, software 705 may be implemented in program instructions and among other functions may, when executed by computing system 700 in general or processing system 701 in particular, direct computing system 700 or processing system 701 to analyze motion of a solid model of a machine to generate a motion profile of the solid model, configure an industrial controller system based on the motion profile of the solid model, and execute a simulation of the machine controlled by the industrial controller system. Software 705 may further direct computing system 700 or processing system 701 to analyze motion of the simulation of the machine as controlled by the industrial controller system, and compare the motion of the simulation of the machine to the motion profile of the solid model to determine how closely the motion of the simulation of the machine as controlled by the industrial controller system matches the motion profile of the solid model.

Software 705 may include additional processes, programs, or components, such as operating system software or other application software. Examples of operating systems include Windows®, iOS®, and Android®, as well as any other suitable operating system. Software 705 may also comprise firmware or some other form of machine-readable processing instructions executable by processing system 701.

In general, software 705 may, when loaded into processing system 701 and executed, transform computing system 700 overall from a general-purpose computing system into a special-purpose computing system customized to facilitate simulating machines used in industrial automation as described herein for each implementation. Software 705 may also transform the physical structure of storage system 703. The specific transformation of the physical structure may depend on various factors in different implementations of this description. Examples of such factors may include, but are not limited to, the technology used to implement the storage media of storage system 703, whether the computer-storage media are characterized as primary or secondary storage, and the like. For example, if the computer-storage media are implemented as semiconductor-based memory, software 705 may transform the physical state of the semiconductor memory when the software is encoded therein. For example, software 705 may transform the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate this discussion.

Communication interface 707 may include communication connections and devices that allow for communication between computing system 700 and other computing systems (not shown) or services, over a communication network or collection of networks. Examples of connections and devices that together allow for inter-system communication may include network interface cards, antennas, power amplifiers, RF circuitry, transceivers, and other communication circuitry. The aforementioned network, connections, and devices are well known and need not be discussed at length here.

User interface 709 may include a voice input device, a touch input device for receiving a gesture from a user, a motion input device for detecting non-touch gestures and other motions by a user, and other comparable input devices and associated processing elements capable of receiving user input from a user. Output devices such as a display system, speakers, haptic devices, and other types of output devices may also be included in user interface 709. The aforementioned user input devices are well known in the art and need not be discussed at length here. User interface 709 may also include associated user interface software executable by processing system 701 in support of the various user input and output devices discussed above. Separately or in conjunction with each other and other hardware and software elements, the user interface software and devices may provide a graphical user interface, a natural user interface, or any other kind of user interface.

The functional block diagrams, operational sequences, and flow diagrams provided in the Figures are representative of exemplary architectures, environments, and methodologies for performing novel aspects of the disclosure. While, for purposes of simplicity of explanation, methods included herein may be in the form of a functional diagram, operational sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The above description and associated drawings teach the best mode of the invention. The following claims specify the scope of the invention. Some aspects of the best mode may not fall within the scope of the invention as specified by the claims. Also, while the preceding discussion describes embodiments employed specifically in conjunction with the monitoring and analysis of industrial processes, other applications, such as the mathematical modeling or monitoring of any man-made or naturally-existing system, may benefit from use of the concepts discussed above. Further, those skilled in the art will appreciate that the features described above can be combined in various ways to form multiple variations of the invention. As a result, the invention is not limited to the specific embodiments described above, but only by the following claims and their equivalents.

What is claimed is:

1. A non-transitory computer-readable medium having stored thereon instructions that, in response to execution, cause a system comprising a processor to perform operations, the operations comprising:
    based at least on a solid model of a machine, generating a motion profile of the solid model, wherein the solid model comprises motion data of a three-dimensional virtual model of the machine implemented in software;
    based at least on the motion profile of the solid model, configuring an industrial controller system; and
    subsequent to configuring the industrial controller system:
        executing a simulation of the machine controlled by the industrial controller system according to the motion profile;
        analyzing motion of the simulation of the machine as controlled by the industrial controller system;
        comparing the motion of the simulation of the machine to the motion profile of the solid model that is used to generate the simulation of the machine; and
        determining, based on the comparison of the motion of the simulation to the motion profile, how accurately the industrial controller system is controlling the simulation.

2. The non-transitory computer-readable medium of claim 1 wherein the operations further comprise generating the simulation of the machine based on the motion profile.

3. The non-transitory computer-readable medium of claim 1 wherein the operations further comprise reconfiguring the industrial controller system to control the simulation of the machine more closely to the motion profile of the solid model.

4. The non-transitory computer-readable medium of claim 1 wherein the operations further comprise converting the solid model of the machine into the simulation of the machine.

5. The non-transitory computer-readable medium of claim 1 wherein, configuring the industrial controller system based on the motion profile of the solid model comprises configuring the industrial controller system at least based on friction and inertia determined from the solid model.

6. The non-transitory computer-readable medium of claim 1 wherein the industrial controller system comprises an emulated industrial controller implemented in software.

7. A method for facilitating simulating machines used in industrial automation, the method comprising:
    based on a solid model of a machine, generating, by a system comprising a processor, a motion profile of the solid model, wherein the solid model comprises motion data of a three-dimensional virtual model of the machine implemented in software;
    based on the motion profile of the solid model, configuring, by the system, an industrial controller system; and
    subsequent to configuring the industrial controller system:
        executing, by the system, a simulation of the machine controlled by the industrial controller system;
        analyzing, by the system, motion of the simulation of the machine as controlled by the industrial controller system;
        comparing, via the one or more processors, the motion of the simulation of the machine to the motion profile of the solid model that is used to generate the simulation of the machine; and
        based on the comparison of the motion of the simulation to the motion profile, determining, by the system, how accurately the industrial controller system is controlling the simulation.

8. The method of claim 7 further comprising:
    analyzing, by the system, a user-edited motion profile of the solid model; and
    generating the simulation of the machine based on the user-edited motion profile.

9. The method of claim 7 further comprising reconfiguring the industrial controller system to control the simulation of the machine more closely to the motion profile of the solid model.

10. The method of claim 7 further comprising converting the solid model of the machine into the simulation of the machine.

11. The method of claim 7 wherein configuring the industrial controller system based on the motion profile of the solid model comprises configuring the industrial controller system at least based on friction and inertia determined from the solid model.

12. The method of claim 7 wherein the industrial controller system comprises an emulated industrial controller implemented in software.

13. A computer apparatus for facilitating simulating machines used in industrial automation, the computer apparatus comprising:
    a memory that stores executable instructions; and
    a processor, operatively coupled to the memory, that executes the executable components, the executable components comprising:
    a motion analyzer configured to:
        based on a solid model of a machine, generate a motion profile of the solid model, wherein the solid model comprises motion data of a three-dimensional virtual model of the machine implemented in software; and subsequent to receiving a response profile comprising motion data of the machine during a simulation:
  compare the response profile to the motion profile of the solid model that is used to generate the simulation of the machine; and
  determine, based on the comparison of the response profile to the motion profile, how accurately an industrial controller system is controlling the simulation;
an emulator configured to:
  at least based on the motion profile of the solid model, configure the industrial controller system; and
  subsequent to configuring the industrial controller system, control the simulation of the machine using the industrial controller system; and
a simulator configured to:
  execute the simulation of the machine; and
  based on the simulation of the machine, generate the response profile;
wherein the simulator and emulator are operatively coupled, wherein the emulator and the motion analyzer are operatively coupled, and wherein the simulator and the motion analyzer are operatively coupled.

14. The computer apparatus of claim 13 wherein the simulator is further configured to, while executing the simulation, enable transmission of the response profile to the motion analyzer.

15. The computer apparatus of claim 13 wherein the emulator is further configured to receive, from the motion analyzer, a control program corresponding to the motion profile.

16. The computer apparatus of claim 13 wherein the emulator is further configured to reconfigure the industrial controller system to control the simulation of the machine more closely to the motion profile of the solid model.

17. The computer apparatus of claim 13 wherein the motion analyzer is further configured to convert the solid model of the machine into the simulation of the machine.

18. The computer apparatus of claim 13 wherein to configure the industrial controller system at least based on the motion profile comprises configuring the industrial controller system at least based on friction and inertia determined from the solid model.

* * * * *